United States Patent [19]

Bowers

[11] Patent Number: 4,701,036
[45] Date of Patent: Oct. 20, 1987

[54] TRIPLE VIEW MIRROR SYSTEM

[76] Inventor: R. H. Bowers, 1869 Wanninger La., Cincinnati, Ohio 45230

[21] Appl. No.: 849,010

[22] Filed: Apr. 7, 1986

[51] Int. Cl.⁴ .......................... G02B 5/08; B60R 1/10
[52] U.S. Cl. .................................................. 350/622
[58] Field of Search .............. 350/622, 623, 618, 617, 350/616, 612, 605, 639

[56] References Cited

U.S. PATENT DOCUMENTS

| | | | |
|---|---|---|---|
| 3,208,343 | 9/1965 | Prochnow | 350/605 |
| 3,394,978 | 7/1968 | Muller | 350/622 |
| 3,744,885 | 7/1973 | Hurtado et al. | 350/622 |
| 4,435,044 | 3/1984 | Hanin | 350/622 |

FOREIGN PATENT DOCUMENTS

| | | | |
|---|---|---|---|
| 951420 | 10/1956 | Fed. Rep. of Germany | 350/622 |
| 378068 | 5/1907 | France | 350/626 |
| 2475476 | 8/1981 | France | 350/622 |

Primary Examiner—Jon W. Henry

[57] ABSTRACT

This mirror system is designed for tractor-trailer vehicles, for enabling the operator to clearly see the rear of the trailer, particularly, when backing or docking. Primarily, it consists of frame mounted mirrors, which are three in number. The first mirror is mounted forwardly of the cab door and is adjustable to and away from the cab, and is also pivotal vertically and adjacent of a third mirror similarly mounted and powered. A second mirror is provided and is also pivotally vertical, and is mounted rearwardly of the cab door of the vehicle, and the combination of the three provides a wide degree of angle for safety.

1 Claim, 3 Drawing Figures

TRIPLE VIEW MIRROR SYSTEM

BACKGROUND OF THE INVENTION

1. Field of the Invention

This invention relates to vehicle mirrors, and more particularly, to a triple view mirror system.

2. Description of Prior Art

Various types of mirrors have been devised for automotive vehicles, and references of record are the U.S. patents of Luther Sadler U.S. Pat. No. 1,576,793, Wassyl A. Orlowsky U.S. Pat. No. 2,359,706, Leroy W. Prochnow U.S. Pat. No. 3,208,343, and G. L. Cook et al U.S. Pat. No. 3,469,901.

When backing a sleeper tractor and trailer to the right, it is impossible to see the end of the trailer without distortion at present. Convex mirrors are now employed, but create distortion, and distance is hard to conceive. The mirror system in accordance with the present invention, eliminates such distortion and includes a mirror that is set by hand to direct the line of vision from the operator to a second mirror that is set by hand to direct the line of vision to a third mirror. The third mirror is electrically driven from the operator's position and can be made to follow the end of the trailer from a straight down the road position, to a complete ninety degree angle, as when parking or docking.

The principal object of this invention is to provide a triple view mirror system, which will be unique in design for employment on tractor trailer combinations, making it possible to scan a ninety degree angle from a remote position.

Another object of this invention is to provide a triple view mirror system, which will be of such design, as to be superior over convex mirror systems, as the present invention will lower the line of vision and enable small automobiles on the right side of a sleeper tractor and trailer to be seen, thus, illiminating this former blind spot. The design is also such, that distortion is eliminated that formerly prevented the operator from accurately judging distances, and three mirrors will be employed to achieve the intended purpose.

A further object of this invention is to provide a triple view mirror system, which will have one mirror set semi-permanently by hand to direct the line of vision from the operator to a second mirror that will also be semi-permanently set by hand to direct the line of vision to a third mirror, which will be electrically or mechanically driven from the operator's position, and which can be made to follow the end of the trailer from a straight line down the road position, to a complete ninety degree angle, as when parking or docking.

In some applications, the mirrors may be in a fixed position, depending on the size of such, and in other applications, the third mirror of the combination may be made to scan one-hundred and eighty degrees. The third mirror may also be controlled electronically, enabling it to follow the rear of the trailer, unless over-ridden by the vehicle operator, and the sizes of the mirrors may be made, so as to enable the image through the first mirror to just stay inside the second mirror, and the image seen in the second mirror will just stay inside the third mirror, the effect being, that one will be looking into only one mirror.

SUMMARY OF THE INVENTION

Figure 1:
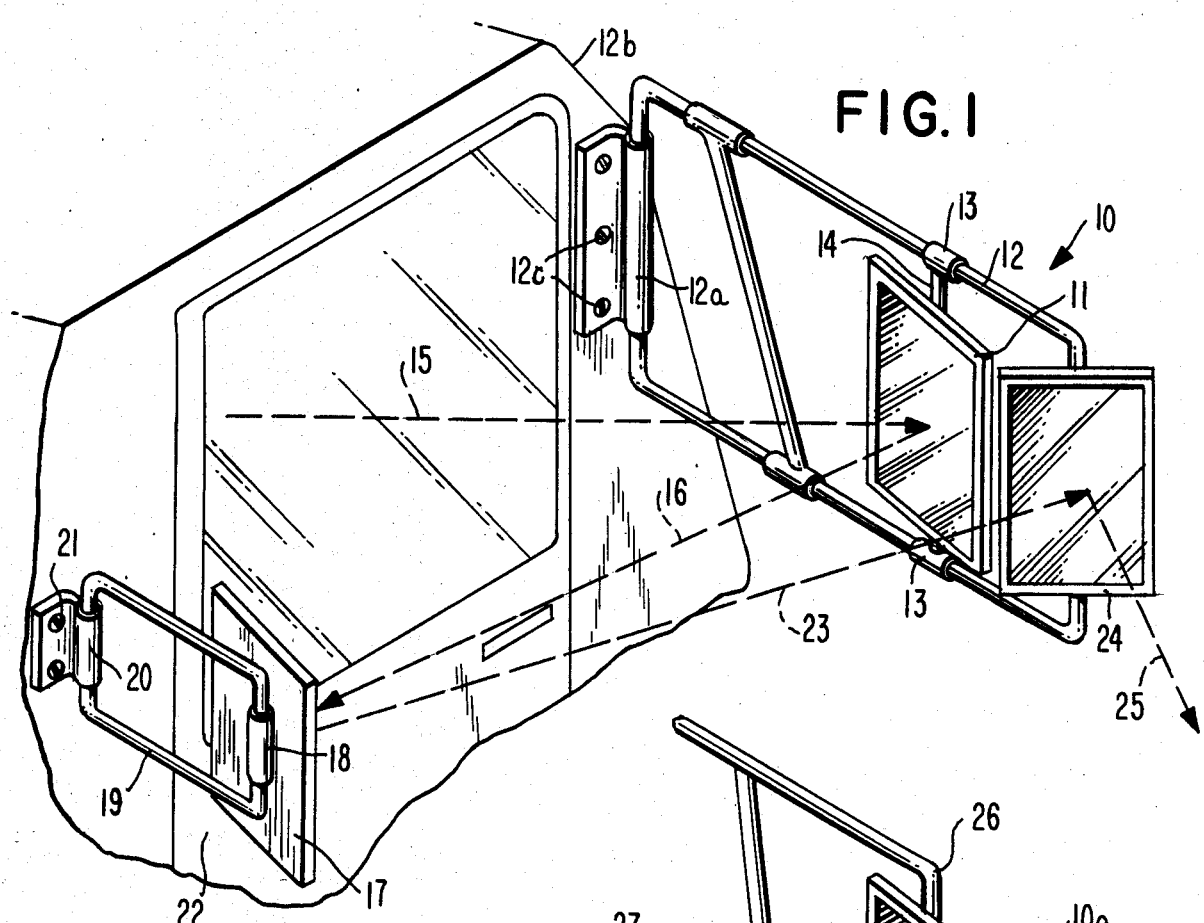
FIG. 1 is a perspective view of the present invention.

A mirror system for tractor and trailer vehicles, comprising three mirrors, one of which is set by hand to direct the line of vision from the operator to a second mirror that is also set by hand to direct the line of vision to a third mirror that is electrically or mechanically driven from the operator's position, and can be made to follow the end of the trailer from a straight down the road position, to a complete ninety degree angle, as when parking or docking.

DETAILED DESCRIPTION

Accordingly, a mirror system 10 is shown to include a first mirror 11 mounted vertically pivotal in a hollow and horizontal rectangular frame 12, which is mounted at one end to a bracket 12a fastened to the front of a vehicle cab 12b, by fasteners 12c. Mirror 11 is secured to a pair of sleeves 13 fixedly secured to a vertical rod 14, and is horizontally slideable within the frame 12 for adjustment purposes. The line of vision from the vehicle operator, is indicated by means of the dash line 15, and the line of vision from first mirror 11 is indicated by dash line 16, as reflecting to a second mirror 17 mounted by its sleeve 18 pivotally to one end of a second horizontal rectangular frame 19. Frame 19 is mounted to a bracket 20 that is fastened by screw fasteners 21, to the rear of the door 22 of cab 12b, and the line of vision from second mirror 17 is indicated by dash line 23 that reflects to a third mirror 24 that is vertically pivotal in a manner, not shown, on the outer end of frame 12. The dash line 25 indicates the line of vision to the end of the trailer, and the third mirror 24 is electrically or mechanically driven from the operator's position, in a manner not shown, and may be made to follow the end of the trailer from a straight down the road position, to a complete ninety degree angle when parking and docking.

In use, when the operator is backing a sleeper tractor and trailer to the right which is a blind side, the line of vision from the operator, line 15, is directed to the first mirror 11 where it is directed back by line 16 to the second mirror 17, and the line of vision as indicated by line 23, is mirrored to the third mirror 24, enabling the operator to see the end of the trailer without distortion, and distance can be judged accurately.

It shall also be noted, that the third mirror may also be electronically controlled, if desired, enabling mirror 24 to automatically follow the rear of the trailer, unless over-ridden by the vehicle operator, and in effect, system 10 puts the operator of the vehicle in the place of the second mirror and a ninety degree angle is seen by adjustment of the third mirror 24.

Figure 2:
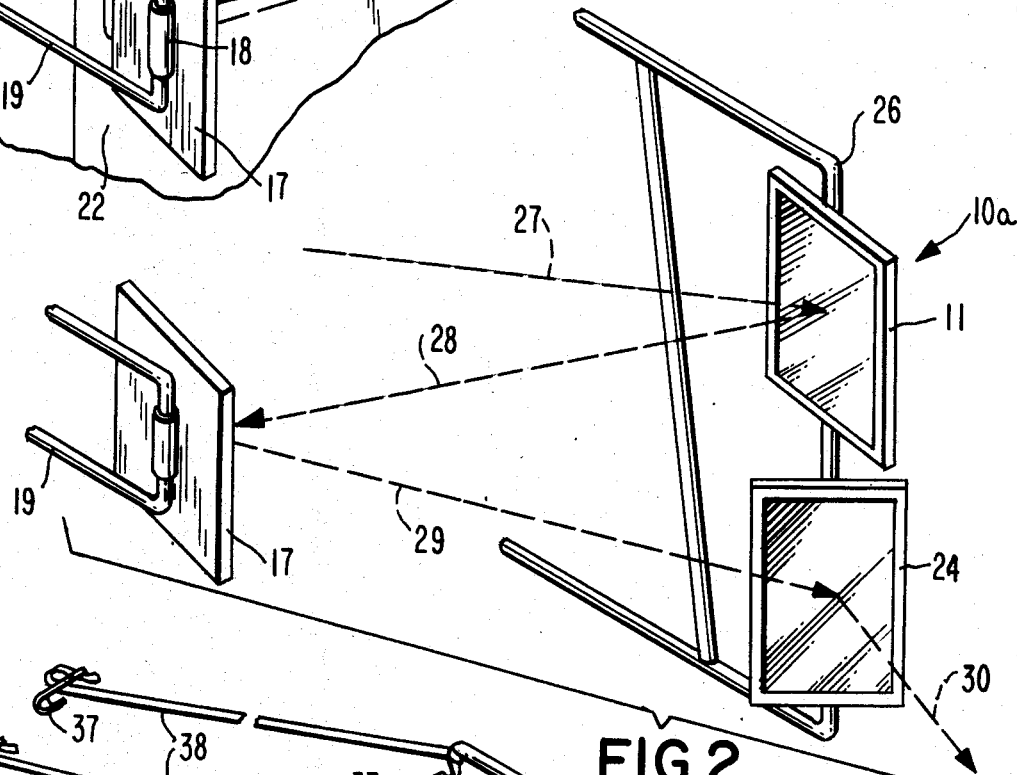
FIG. 2 is a perspective view of a modified form of the invention.

Referring now to FIG. 2, a modified form of system 10a, in which the first mirror 11 is now mounted to a frame 26 above the third mirror 24, for cooperation with the second mirror 17, and the line of vision in reflection is indicated by means of the dash lines 27, 28, 29, and 30. With this arrangement, the mirrors 11 and 24 being mounted one above the other, the line of sight is lowered, enabling small automobiles on the right side of the tractor and trailer combination, to be readily seen by the operator, thereby eliminating the former blind spot.

In use, the modified form 10a functions in a similar manner, as was described of 10, with the exception, that the first mirror 11 is mounted above the third mirror 24 on the same plane.

Figure 3:
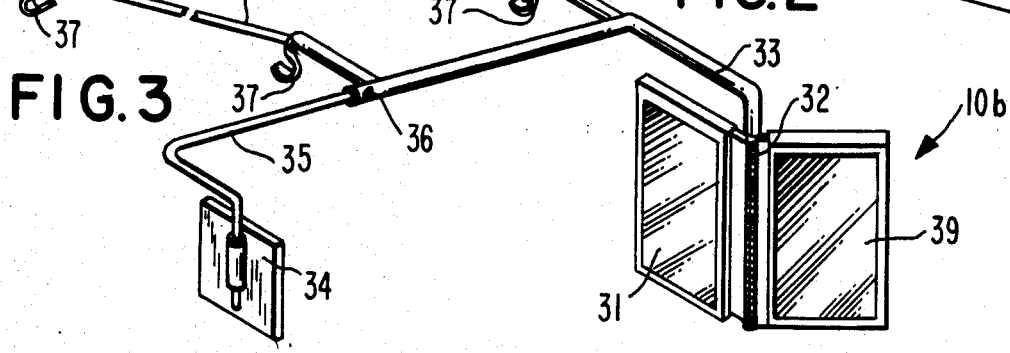
FIG. 3 is a perspective view of another modified form of the invention.

Looking now at FIG. 3, another modified form of system 10b is shown to include a first mirror 31 vertically pivotal on a hinge 32 fixedly secured to a horizontal frame 33, and a second mirror 34 is vertically pivotal on a rod 35 telescopingly received in one end of frame 33. The distance adjustment of mirror 34, is set by a set screw 36 received in frame 33, and clip members 37 are provided and connected to strap 38 means for attaching system 10b to automobiles or vans at the roof gutter strippings. The third mirror 39 is adjacent to the first mirror 31, and is similarly attached to the opposite side of the hinge 32, so as to be pivotally adjustable.

In use, system 10b functions in the same manner, as described of 10, with the exception, that the first and third mirrors 31 and 39 are attached to a common hinge, the second mirror 34 is adjustably spaced from mirrors 31 and 39, and the arrangement is detachable from an automobile or van by the clips 37 and the strap 38 means.

It shall further be recognized, that the three mirrors herein described, may be contained in one assembly and mounted as a single unit, if desired.

While various changes may be made in the detail construction, such changes will be within the spirit and scope of the present invention, as defined by the appended claims.

What I now claim is:

1. A vehicle cab rear view mirror assembly comprised of a first frame mounted on an exterior forward side portion of the vehicle cab, a first mirror adjustably mounted on said first frame, a second frame mounted on an exterior rear portion of the vehicle cab, a second mirror adjustably mounted on said second frame, and a third mirror adjustably mounted on said first frame adjacent said first mirror, whereby with said second mirror facing the first and third mirrors a rearward view may be consecutively reflected by said third mirror, said second mirror, and said first mirror respectively for viewing by an occupant of the vehicle cab.

* * * * *